May 1, 1928.
L. TARWATER
LOCK NUT
Filed June 18, 1927
1,667,751
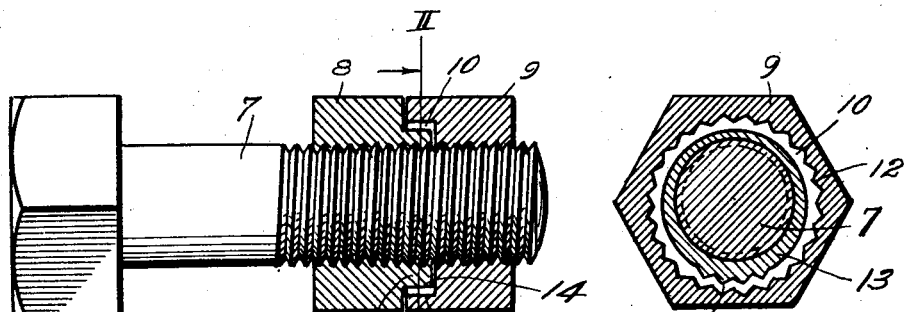
Fig. 1  Fig. 2
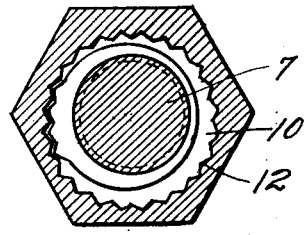
Fig. 3
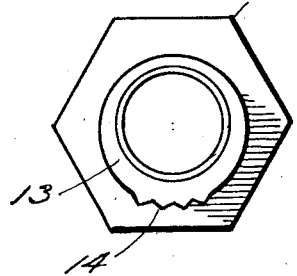   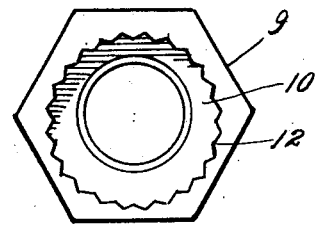
Fig. 4   Fig. 5
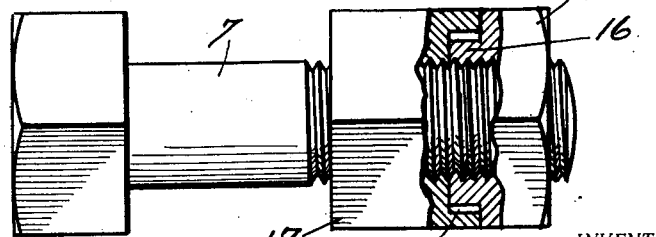
Fig. 6
INVENTOR.
Lawson Tarwater
BY
Roy E Hamilton
ATTORNEY.

Patented May 1, 1928.

1,667,751

UNITED STATES PATENT OFFICE.

LAWSON TARWATER, OF KANSAS CITY, MISSOURI, ASSIGNOR TO UNIVERSAL NUT-LOCK AND BOLT COMPANY, OF KANSAS CITY, MISSOURI.

LOCK NUT.

Application filed June 18, 1927. Serial No. 199,814.

This invention relates to improvements in nut locking devices, and particularly to that type in which a main nut and a locking nut are securely held in position when they are positioned to exert an opposing longitudinal pressure against the bolt threads.

The object of this invention is to provide a nut locking device having a minimum number of parts, simplicity of form, of sturdy construction and convenience of operation.

A further object of this invention is the contemplation of a nut locking device in which the main nut is set to any desired position, then the locking nut is tightened against the main nut to exert opposite longitudinal pressure against the bolt threads, and means integral with said nuts for locking the same against relative movement when in the locked position.

Minor objects of this invention will appear during the course of the detailed specification, referring to the accompanying drawing, wherein Figure 1, shows a nut locking device embodying this invention, in which the bolt is in elevation, and the nuts in section; said nuts being shown in the unlocked position.

Fig. 2, is a cross-section on line II—II of Fig. 1.

Fig. 3, is a cross-section on line II—II of Fig. 1, with lock nut turned to the locked position.

Fig. 4, is a face view of the main nut.

Fig. 5, is a face view of the locking nut, and

Fig. 6, is an elevation partly broken away, of a modified form of this invention.

Referring now to the drawing in detail, the numeral 7 designates a threaded bolt, 8 the main nut, and 9 the lock nut. Main nut 8 is provided with an eccentric socket 10, having a tooth wall 12, said teeth having inclined surfaces. The main nut 8 is provided with an eccentric shank 13, which is adapted to enter socket 10 in lock nut 9, and is provided with teeth 14 on its outer periphery. Said teeth 14 are located on that portion of the eccentric shank 13, which is the greatest distance from the axis of the nut. When the nuts are positioned on the bolt in the unlocked position, as clearly shown in Fig. 2, the teeth 14 and the teeth 12 are spaced apart from each other. Referring now to Fig. 3, in which the lock nut 9 has been turned to the locked position; as the lock nut 9 is rotated relatively to main nut 8, the teeth 14 will engage teeth 12 in the eccentric socket 10. Due to the natural back-lash or looseness between the threads on the bolt and the threads in the nut, the teeth 14 may be forced over the teeth 12 and after this has been accomplished, the teeth 14 will engage teeth 12 and hold the nuts in a fixed relative position against accidental movement. The amount of rotation of lock nut 9 necessary to lock the two nuts together on the bolt 7 is less than 180 degrees, and the eccentricity of the socket 10 is such as to allow the lock nut 9 to be rotated thru that angle. With the construction as shown, it is evident that the lock nut may be rotated either to the right hand or to the left hand, and thereby produce the same locking effect. Therefore, it is obvious that this construction may be used on either a right hand or left hand threaded bolt, and obtain the same results.

It is apparent that when the lock nut 9 has been turned to the locked position, that the main nut 8 and the lock nut 9 will exert opposite and substantially longitudinal pressures against the threads of the bolt 7, thus setting up a frictional engagement which will prevent the accidental turning of the nuts on said bolt. It is evident that the general principle used in locking the nuts against rotation on the bolt is substantially the same as used in the ordinary jam nut or check nut, but this invention has for its object, means for securely holding said nuts in a fixed relative position without the use of any intermediate parts.

As shown in Fig. 6, it is apparent that the lock-nut 15 is provided with an eccentric shank 16, while the main nut 17 is provided with an eccentric socket 18. Said socket 18 and shank 16 are provided with teeth as in the preferred form. It is evident that the simple reversal of these parts does not in any way affect the operation of a nut locking device, and the same principles as set forth above will apply to the construction as shown in this modified form.

I do not limit my invention to the construction shown and described as many modifications within the scope of the appending claims may be made without departing from the spirit of this invention.

The operation of a device made in accordance with this invention has been made clear thruout the specification, and what is claimed as new and desired to be secured by Letters Patent is:

1. In a nut locking device, the combination with a threaded bolt, of a main nut and a lock-nut, one of said nuts being provided with an eccentric socket having a toothed wall, and the other nut being provided with an eccentric shank having a toothed periphery, the teeth being so arranged that they are spaced apart from the toothed wall of the other nut when the nuts are in the unlocked position, and engage said toothed wall when the nuts are in the locked position.

2. In a nut locking device, the combination with a threaded bolt, of a main nut and a lock-nut provided one with an eccentric shank around its hole entering a corresponding toothed eccentric socket in the other, said shank having teeth at its portion farthest from its axis to engage said socket when the teeth are turned to the locked position.

3. In a nut locking device, the combination with a threaded bolt, of a main nut and a lock-nut provided one with an eccentric socket having a longitudinally fluted wall receiving a corresponding eccentric shank of smaller diameter having teeth at its portion of greatest axial distance, said teeth being spaced apart from the fluted wall when in the unlocked position and engaging said wall when turned in either direction.

In testimony whereof, I hereunto affix my signature.

LAWSON TARWATER.